US005607324A

United States Patent [19]

Saur et al.

[11] Patent Number: 5,607,324

[45] Date of Patent: Mar. 4, 1997

[54] ELECTRIC CONNECTION FOR A COMPONENT ARRANGED IN A LIQUID-CARRYING HOUSING

[75] Inventors: Roland Saur, Stuttgart; Barbu Frunzetti, Kornwestheim, both of Germany

[73] Assignee: Behr Thomson-Dehnstoffregler GmbH & Co., Kornwestheim, Germany

[21] Appl. No.: 479,438

[22] Filed: Jun. 7, 1995

[30] Foreign Application Priority Data

Jun. 22, 1994 [DE] Germany .............................. 9410113 U

[51] Int. Cl.[6] .................................................... H02R 13/73

[52] U.S. Cl. ........................................... 439/565; 248/27.3

[58] Field of Search .................................... 439/544, 565, 439/563, 347; 248/27.1, 27.3

[56] References Cited

U.S. PATENT DOCUMENTS 4,302,066 11/1981 Newman et al. ....................... 439/347
4,871,323 10/1989 Ohsumi .................................. 439/347
5,207,593 5/1993 Bogiel .................................... 439/347
5,219,185 6/1993 Oddenino ................................ 285/26

FOREIGN PATENT DOCUMENTS 0035378 9/1981 European Pat. Off. .

*Primary Examiner*—Gary F. Paumen
*Assistant Examiner*—T. C. Patel
*Attorney, Agent, or Firm*—Evenson, McKeown, Edwards & Lenahan, P.L.L.C.

[57] ABSTRACT

An electric connection for an element arranged in a liquid-carrying component and from which at least one electric line leads to an outside contact of a plug housing which is contained in a frame of the component is provided. The plug housing of a connector plug is held in the frame using a bow-shaped spring. A bow-shaped spring is laterally fitted from an exterior side onto the frame. The frame is provided with recesses into which legs of the bow-shaped spring project and, in each case, reach over one stop respectively of the plug housing.

8 Claims, 1 Drawing Sheet

ELECTRIC CONNECTION FOR A COMPONENT ARRANGED IN A LIQUID-CARRYING HOUSING

BACKGROUND AND SUMMARY OF THE INVENTION

The present invention relates to an electric connection for an element which is arranged in a liquid-carrying component and from which at least one electric line leads to an outside contact of a plug housing which is held in a frame of the component.

An electric connection of the above-mentioned type is particularly required for a heating element used to heat a thermostatic working element of a thermostatic valve of a cooling system of a motor vehicle engine. A conventional constructive solution consists of connecting the electric lines leading away from the heating element to contacts which are contained in a plug housing. The plug housing is inserted into a frame of a housing or of a line with the insertion of a sealing ring. If the housing is made of metal, the frame is normally flanged around a collar-shaped stop of the plug housing so that the plug housing is held in the frame. If the housing is made of a plastic material, a conventional solution consists of welding the plug housing, which is also made of plastic, together with the frame. These constructions require relatively high expenditures, particularly if the housing has a relatively complicated shape and the frame is not easily accessible.

There is therefore needed an electric connection of the above-mentioned type which is easy to mount, even if the component has a complicated shape and the frame is not easily accessible from all sides.

These needs are met according to the present invention in that the plug housing is held in the frame using a bow-shaped spring which is fitted laterally from the outside onto the frame. The frame is provided with recesses into which the legs of the spring project and in the process, in each case, the legs of the spring reach over a stop of the plug housing.

A connection of this type according to the invention is easy to establish and, particularly also in the case of a complicated shape of the component, such as a housing, a pipe, or the like, and in the case of a poorly accessible frame, is easy to mount. This is because it is not required that the frame be accessible from all sides for mounting the bow-shaped spring. Since the bow-shaped spring is fitted on from one side, it is sufficient that the frame is accessible only from this one side for the mounting of the bow-shaped spring.

In a further embodiment of the present invention, the legs of the spring are in each case provided with a right-angle bend directed to the interior of the frame and which engage in the recesses of the frame. It is therefore ensured that the bow-shaped spring cannot become detached in an automatic manner.

Other objects, advantages and novel features of the present invention will become apparent from the following detailed description of the invention when considered in conjunction with the accompanying drawings.

DETAILED DESCRIPTION OF THE DRAWINGS

Figure 1:
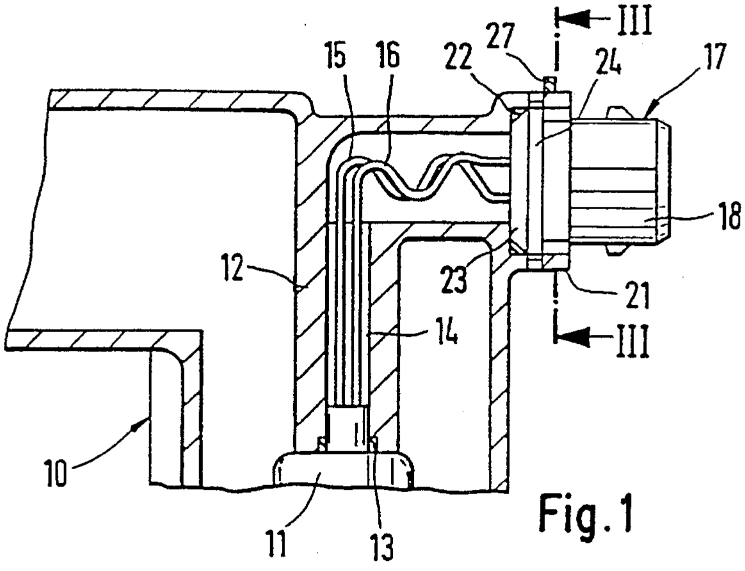
FIG. 1 is a partial sectional view of a liquid-carrying housing with an electric element and an electric connection to this element.
Figure 2:
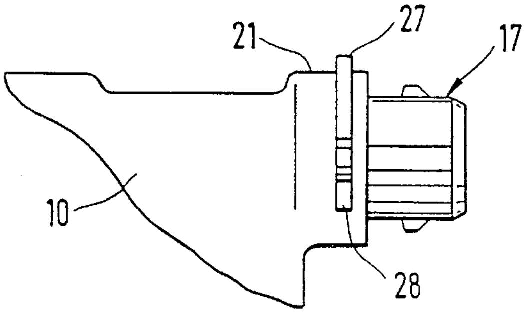
FIG. 2 is an exterior view of the area of the connection.

FIG. 1 is a partial sectional view of a housing 10 of a thermostatic valve of a cooling system of an internal-combustion engine. Coolant flows through the interior of the housing 10. In the interior of the housing 10, an electric element is arranged, particularly a heating element 11. In certain situations, the heating element 11 is supplied with electric energy in order to influence the opening position and therefore the control function of the thermostatic valve. For this purpose, the thermostatic working element of the thermostatic valve can be heated by means of the electric heating element 11. From the heating element 11, which is held in a projection 12 of the housing 10 and is sealed off by means of a sealing ring 13, within a duct 14, two electric lines 15, 16 lead to a connector plug 17.

Figure 3:
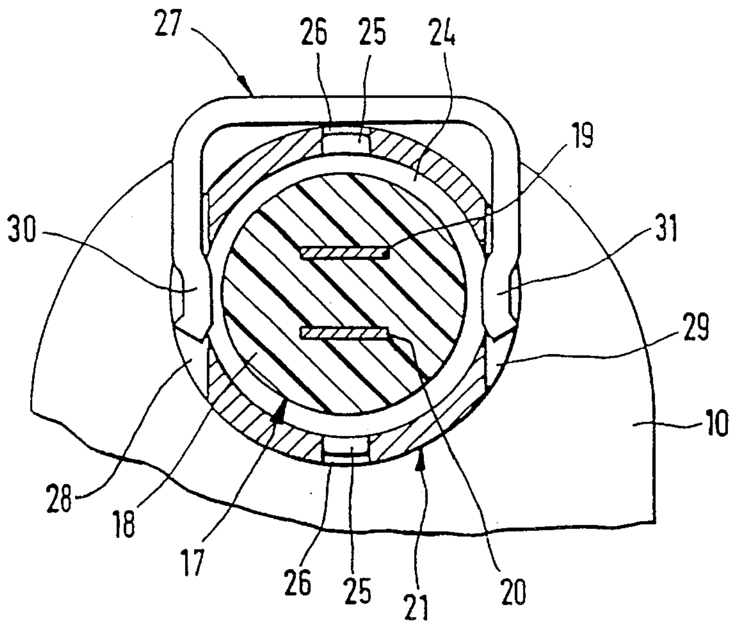
FIG. 3 is an enlarged sectional view taken along Linc III—III in FIG. 1.

The connector plug 17 includes a plug housing 18 in which two flat plugs 19, 20 are arranged which are connected with the electric lines 15, 16 (FIG. 3). The flat plugs 19, 20 are connected with the lines 15, 16 whose length is slightly larger than the length of the duct 14. Subsequently, the plug housing 17 is placed and secured in a frame 21 of the housing 10 with the insertion of a sealing ring 22. The plug housing 18 is provided with an interior diagonal ring shoulder 23 which presses the sealing ring 22 into a step of the frame 21. The diagonal ring shoulder 23 is adjoined by a ring shoulder 24 which is provided with two diametrically opposite detents 25 (FIG. 3) which engage in recesses 26 of the frame 21 so that the connector plug 17 is arranged in a predetermined position.

The face of the ring shoulder 24 which faces away from the diagonal ring shoulder 23 is used as a stop for the legs of a bow-shaped spring 27 by means of which the connector plug 17 is held in the frame 21.

The bow-shaped spring 27, which has an essentially U-shaped form, is fitted from the side in the radial direction onto the frame 21. The frame 21 is provided with two diametrically opposite, slot-shaped incisions 28, 29. The legs of the bow-shaped spring 27 are provided with right-angle bends 30, 31 which are directed toward the interior of the frame 21, which project into the interior of the frame 21 and, in the process, reach over the stop surface of the ring shoulder 24 so that the plug housing 17 is secured in the frame 21 in this manner. The bow-shaped spring 27 has a rectangular cross-section so that right-angle bends 30, 31 rest flatly against the stop surface of the ring shoulder 24.

The above-explained electric connection, that is, the construction of the frame 21, of the connector plug 17 and of the securing arrangement using the bow-shaped spring 27 may be implemented in the same manner for a housing 10 made of either metal or a plastic material. In both cases, it is advantageous that the mounting of the plug housing is very simple and also does not require that the frame 21 be easily accessible from all sides. A good one-sided accessibility is sufficient for mounting the bow-shaped spring 27. The construction of the connection, whose principle is the same, can also be implemented when the electric element, which may also be a temperature switch or a pressure switch, or the like, is arranged in a line or pipe through which a liquid flows.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electric connection comprising an element arranged in a liquid-carrying component and from which at least one electric line leads to an outside contact of a plug housing which is contained in a frame of the component, further comprising:

a bow-shaped spring, the plug housing of a connector plug is held in said frame with said bow-shaped spring, said bow-shaped spring being fitted laterally from the outside onto said frame; and wherein said frame is provided with recesses into which legs of said bow-shaped spring project and, in each case, reach over one stop respectively of the plug housing.

2. A connection according to claim 1, wherein the frame is provided with slot-shaped incisions situated at diametrically opposite points.

3. A connection according to claim 1, wherein legs of said bow-shaped spring are each provided with a right-angle bend directed toward an interior of the frame and which engage in said recesses of said frame.

4. A connection according to claim 3, wherein the frame is provided with slot-shaped incisions situated at diametrically opposite points.

5. A connection according to claim 1, wherein said bow-shaped spring has a rectangular cross-section at least in an area of its legs.

6. A connection according to claim 5, wherein the frame is provided with slot-shaped incisions situated at diametrically opposite points.

7. A connection according to claim 3, wherein said bow-shaped spring has a rectangular cross-section at least in an area of its legs.

8. A connection according to claim 7, wherein the frame is provided with slot-shaped incisions situated at diametrically opposite points.

* * * * *